United States Patent [19]

Panson

[11] Patent Number: 4,764,337
[45] Date of Patent: Aug. 16, 1988

[54] CORROSION INHIBITING MEDIA FOR PRESSURIZED WATER REACTOR STEAM GENERATORS

[75] Inventor: Armand J. Panson, Pittsburgh, Pa.

[73] Assignee: Westinghouse Electric Corp., Pittsburgh, Pa.

[21] Appl. No.: 906,723

[22] Filed: Sep. 12, 1986

[51] Int. Cl.$^4$ .............................................. G21C 19/00
[52] U.S. Cl. ................................. 376/306; 252/78.1; 252/389.41; 422/12
[58] Field of Search .......................... 252/389.41, 78.1; 376/306; 422/12

[56] References Cited

U.S. PATENT DOCUMENTS

| | | | |
|---|---|---|---|
| 2,497,521 | 2/1950 | Trautman | 252/389.41 |
| 3,361,672 | 1/1968 | Andress, Jr. et al. | 252/49.6 |
| 3,711,411 | 1/1973 | Sawyer et al. | 252/78 |
| 3,738,941 | 6/1973 | Collins | 252/389 |
| 4,204,259 | 5/1980 | Yabe | 438/497 |
| 4,301,026 | 11/1981 | Kondo et al. | 252/400 |

FOREIGN PATENT DOCUMENTS

| | | | |
|---|---|---|---|
| 669974 | 9/1963 | Canada | 376/306 |
| 1385888 | 3/1975 | United Kingdom . | |

OTHER PUBLICATIONS

G. E. Von Nieda, G. Economy and M. J. Wooten, Denting in Nuclear Steam Generator-Laboratory Evaluation of Carbon Steel Corrosion Under Heat Transfer Conditions, Materials Performance, vol. 20, No. 6, pp. 38-44 (Jun. 1981).
B. J. Harkins, C. R. Wilson and M. W. Rootham, The Application of Hydrogen Measurement Techniques of Monitoring PWR Steam Generator Corrosion, Material Performance (Dec. 1982), pp. 31-35.
W. M. Connor, G. Economy, A. R. Vaia, G. E. Von Nieda and M. J. Wootten, Denting in Recirculating Steam Generators-a Laboratory Study, Water Chemistry II, BNES, 1980, pp. 65-72 (Paper 11).
Ralph Elliott Rippere and Victor K. LaMer, Volatile Borates of Polyhydric Alcohols and the Activation of Boric Acid, J. Phys. Chem., 47, 204 (1943).
J. Boesken and N. Vermaas, On the Composition of Acid Boric Acid-Diol Compounds, J. Phys. Chem., 35, 1477 (1931).
Von Harold Schaefer, Uber die Aktivierung der Borsaure mit Polyoxyverbindungen und die Vorgange bel der Makanalytischen Bestimmung der Aktivierten Borsaure, Z. Anorg. Allg. Chem. 247 (1941), 96.
J. Boeseken, N. Vermaas et A. Th. Kuchlin, La Composition Et L'Acidite Des Acides Boro-Glycoliques, Rec. Trav. Chim. 49, 711 (1930).

Primary Examiner—Deborah L. Kyle
Assistant Examiner—Richard W. Wendtland

[57] ABSTRACT

A corrosion inhibiting aqueous steam generation medium for use in the secondary system of a nuclear steam generator comprises from about 5 to 10 ppm boric acid and an equimolar amount of a polyhydric compound, such as a lower alkyl glycol or glycerol, capable of reacting with the boric acid to increase its acid strength and therefore its corrosion inhibiting properties and produce therewith, a volatile diol boric acid complex.

25 Claims, No Drawings

CORROSION INHIBITING MEDIA FOR PRESSURIZED WATER REACTOR STEAM GENERATORS

BACKGROUND OF THE INVENTION

1. Field of the Invention

The present invention relates to corrosion inhibiting aqueous media for use in steam generator applications and in particular relates to the use of activated boric acid compounds for inhibiting carbon steel corrosion in the secondary system of nuclear steam generators.

2. The Prior Art

The use of boric acid for preventing or at least inhibiting carbon steel corrosion in the secondary water systems of nuclear steam generators has been known for sometime. In particular, boric acid has been utilized to minimize the phenomena known as denting at the tube/tube support plate interface in nuclear steam generators. A full report of the use of boric acid for such purposes is contained in a publication entitled "Implementation of Boric Acid in the Field-Indian Point Unit 3 Plant" prepared by Westinghouse Electric Corporation, Nuclear Technology Division for Steam Generator Owners Group and Electric Power Research Institute. Copies of this report are available through Research Reports Center, Box 50490, Palo Alto, Calif. 94303. While boric acid alone has been found to be highly useful for inhibiting carbon steel corrosion of the type which results in denting, nuclear applications require a continuous search for improved systems and increased reliabilities. Diol boric acid compounds which are more strongly acidic than boric acid alone are known from such prior publications such as an article entitled "On the Composition of Acid Boric Acid-Diol Compounds", J. Boeseken and N. Vermaas, J. Phys. Chem., 35, 1477 (1931) and an article entitled "Volatile Borates of Polyhydric Alcohols and the Activation of Boric Acid", R. E. Rippere and V. K. La Mer, J. Phys. Chem., 47, 204 (1943). These articles discuss the reactions between boric acid and diol compounds to activate boric acid by producing diol boric acid complexes which have more acidic characteristics than does boric acid itself. However there is no suggestion in the prior art that such diol boric acid complexes are capable of inhibiting corrosion. And even more so there is no disclosure that diol boric acid complexes might be useful for inhibiting carbon steel corrosion in nuclear steam generator applications.

SUMMARY OF THE INVENTION

The present invention is directed to a corrosion inhibiting steam generation medium comprising an aqueous solution containing a corrosion inhibiting quantity of an activited diol boric acid complex formed by reacting equimolar proportions of boric acid and a polyhydric compound capable of reacting therewith to form such complex. The polyhydric compound may be any one of a large number of compounds, i.e., glycols and glycerols, which have a plurality of hydroxy and/or equivalent groups such as carboxyl, and the same is selected principally for its ability to react with boric acid to form activated diol boric acid compounds having a generalized structure of the type

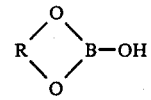

The present invention is also directed to a corrosion inhibiting aqueous steam generation medium prepared by adding to the steam generator water system, a corrosion inhibiting quantity of boric acid and an activating amount of a polyhydric compound capable of reacting with a boric acid to form an activated diol boric acid compound having the structure as set forth above. During normal steam generation operation, the boric acid will preferably be present in the medium in an amount of from about 5 to about 10 ppm, as determined by measuring the boric acid concentration in the steam generator blowdown. The polyhydric compound should generally be present in the medium in an amount that is equimolar to the amount of boric acid in the medium.

The present invention also provides a method for inhibiting corrosion in a steam generating system which comprises providing a corrosion inhibiting quantity of boric acid in the steam system water and incorporating, in the boric acid containing steam system water, an activating amount of a polyhydric compound sufficient to increase the acid strength of the boric acid and thus improve its corrosion inhibiting characteristics. In a generally more preferred form of the invention, the polyhydric compound is present in the water in an amount which is equimolar to the amount of boric acid in the water and the polyhydric compound is capable of reacting with boric acid to produce an activated diol boric acid compound having the generalized structure set forth above.

More specifically, the invention provides a method for inhibiting carbon steel corrosion in the secondary system of a nuclear steam generator which comprises providing a corrosion inhibiting quantity of boric acid in the secondary system water and additionally incorporating in such system water, an activating amount of a polyhydric compound sufficient to increase the acid strength of the boric acid and thus improve its corrosion inhibiting characteristics.

For best corrosion inhibiting results, the secondary system may be subjected to a low power soak with water containing increased levels of the boric acid and the polyhydric compound before the generator is powered up for normal full power operation. Accordingly, in a particularly preferred aspect of the invention, the boric acid and the polyhydric compound are present in the secondary system water in equimolar amounts and the boric acid is present in the such water in an amount of from about 30 to about 100 ppm during the soak and then in an amount of from about 5 to about 10 ppm during normal full power operation of the generator.

By using a corrosion inhibiting generation medium as described above in the secondary steam generation system of a nuclear reactor steam generator, it has been found that increased protection is provided against intergranular attack in the crevice regions of the tube support structure as well as against carbon steel corrosion of the type which results in denting. In this regard, the boric acid complex of the present invention exhibits an increased ability to neutralize alkaline impurities that can concentrate in crevice regions during heat transfer and cause intergranular corrosive attack. The complexes of the present invention also are effective for preventing the corrosion which causes denting.

DESCRIPTION OF THE PREFERRED EMBODIMENT

The present invention is directed to a new and improved water chemistry treatment for pressurized water reactor steam generators. In particular, the present invention will provide an additional measure of security in connection with nuclear reactor steam generators, although the broad concepts of the invention should also be useful in connection with fossil fueled steam generator systems. For all practical and generalized purposes, steam generation, whether caused by a nuclear reaction or by the burning of fossil fuel, is characterized by the formation of steam in an indirect heat exchanger with the water to be vaporized on one side and a heated media, either gaseous or liquid, on the other. Nuclear steam generators of the sort with which the present invention is useful are well known to the practitioner in the art to which the present invention applies, and descriptions of the same may be found in a number of prior art publications. In particular, the nuclear steam generators of the type with which the present invention finds particular utility are described in the prior art in the following articles: "Denting and Nuclear Steam Generators-Laboratory Evaluation of Carbon Steel Corrosion Under Heat Transfer Conditions", G. E. Von Nieda, G. Economy and M. J. Wootten, Materials Performance, Vol. 20, No. 6, pp. 38-44 (June 1981); "Denting In Recirculating Steam Generators - A Laboratory Study", W. M. Connor, A. R. Vaia, G. E. Von Neida and M. J. Wootten, Water Chemistry II, BNES, 1980, Paper 11; and "The Application of Hydrogen Measurement Techniques for Monitoring PWR Steam Generator Corrosion", B. J. Harkins, C. R. Wilson M. W. Rootham, Materials Performance, (December, 1982), pp. 31-35.

The phenomena of corrosion inhibition remains, in many instances, a highly developed art as opposed to an exact science. The mechanism of corrosion prevention is not always completely understood and corrosion inhibition research and development still involves many empirical considerations. For the purposes of the present invention, it is simply theorized that corrosion inhibition is improved by activiting, that is by increasing the acid strength of boric acid. It is believed that the increase in acid strength improves the ability of the boric acid to neutralize caustic impurities that concentrate in crevice regions in steam generators during heat transfer and it is further believed that intergranular corrosive attack results from the presence of such impurities in the crevices. It is also theorized that the increased acidity of the boric acid resulting from complexing with a polyhydric compound inhibits the development of the corrosion products and deposits which cause in tube denting.

In general, the present invention involves the presence of a corrosion inhibiting quantity of an activated diol boric acid complex in the steam generation medium which, most generally speaking, is an aqueous solution. The complex generally is formed simply by adding, to the feed water, both boric acid and a polyhydric compound capable of reacting with the boric acid to form an activated diol boric acid complex. The boric acid is added to the feed water in an amount of approximately 5 to 10 ppm and it is believed that the level of boric acid in the water phase itself will be maintained at approximately such level throughout the water system whereby the amount of boric acid in the steam generator blowdown also will be at a level of approximately 5 to 10 ppm. The amount of polyhydric compound added to the steam generation medium generally should be in an amount which is equimolar to the amount of boric acid such that all of the boric acid is involved in the formation of a diol boric acid complex having a structure of the type

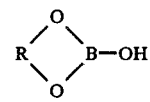

Suffice it to say that the relative quantities of boric acid and the polyhydric compound may vary somewhat in accordance with the present invention. However, if the relative amount of polyhydric compound is too low the boric acid will not be activated, and if it is too high, increased acidity of the boric acid may itself become a source of corrosion.

In systems which utilize only boric acid for corrosion inhibition, when the boric acid content in the liquid phase steam generation medium is maintained at about 10 ppm, the amount of boric acid in the steam phase will be about 0.9 ppm. Thus, the concentration of boric acid in the steam is about 9% of the boric acid which had been present in the boiling water. This may be described as a partition factor in the range of about 0.09. This level is believed to be the level which is desirable for inhibiting corrosion in those areas of the system which are contacted with steam and/or condensate. Of course the partition factor of 0.09 is an empirical factor and the actual amount of inhibiting agent in the main steam depends, in large measure, on the operating pressures and temperatures of the system.

In accordance with the present invention, when a polyhydric compound is incorporated in the system water along with the boric acid, the partition factor is influenced. And preferably, the diol boric acid complex formed in accordance with the present invention will be volatile, that is vaporizable and capable of existing in the gaseous state under the system conditions. In fact, one of the advantages obtained through the use of the present invention is that the volatility of the diol boric acid complex may be adjusted simply by changing the molecular weight of the polyhydric compound. In this regard, it is a generalized proposition that the volatility of the diol boric acid complex will decrease as a function of an increase in the molecular weight of the polyhydric compound. Accordingly, with all else being equal, the partition factor will decrease with an increase in the molecular weight of the polyhydric compound. This phenomena should be very helpful in the empirical determination of the appropriate conditions for maximizing corrosion inhibition.

Suffice it to say, that in the preferred embodiment of the present invention, which involves the generation of steam in the secondary system of a nuclear reactor, corrosion is best inhibited when the boric acid levels are maintained in the range of about 5 to 10 ppm and the polyhydric compound is included in an amount which is equimolar to the amount of boric acid. Morever, the polyhydric compound preferably should be such that a partition factor of approximately 0.09 is achieved under normal operating conditions. Such partition factor can generally be achieved using a polyhydric compound which is a lower alkyl glycol or glycerol such as ethylene glycol, propylene glycol, 2,3-butylene glycol, glycerol or mannitol. The particularly preferred polyhydric compound for use in connection with the present invention is mannitol.

For rhe best results in inhibiting corrosion in a nuclear steam generator, an initial low power soak is preferred. During the low power soak conducted at approximately 25% of reactor power, the boric acid content should preferably be at an increased level of around 30 to 100 ppm and most preferably should be maintained in the level of about 50 ppm. Similarly to normal operation, the amount of the polyhydric compound is preferably maintained in equimolar proportions to the amount of the boric acid. The soak should preferably be continued for approximately 4 days and at least until pH and chloride levels in the steam blowdown have stabilized. After the initial 4 day soak, the boric acid content in the feed water may be reduced to approximately 5 to 10 ppm along, with a similar reduction in the content of polyhydric compound in the feed water.

In sum, the secondary system of the nuclear reactor may be treated with the diol boric acid complex in a manner which is completely analogous to the present methods for treating the system with boric acid alone, all as is fully disclosed in the prior art publications identified above and which deal primarily with the prevention of denting.

I claim:

1. A corrosion inhibiting steam generation medium comprising an aqueous solution containing a corrosion inhibiting quantity of an activated diol boric acid complex formed by reacting equimolar proportions of boric acid and a polyhydric compound capable of reacting therewith to form such complex.

2. The invention of claim 1, wherein said complex comprises a diol boric acid compound having a structure of type

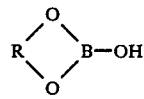

3. The invention of claim 1, wherein said polyhydric compound comprises propylene glycol.

4. The invention of claim 1, wherein said polyhydric compound comprises ethylene glycol.

5. The invention of claim 1, wherein said polyhydric compound comprises 2,3-butylene glycol.

6. The invention of claim 1, wherein said polyhydric compound comprises mannitol.

7. The invention of claim 1, wherein polyhydric compound comprises glycerol.

8. A corrosion inhibiting aqueous steam generation medium prepared by adding to the steam generator water system, a corrosion inhibiting quantity of boric acid and an activating amount of a polyhydric compound capable of reacting with the boric acid to form an activated diol boric acid complex having the structure

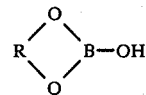

9. The invention of claim 8, wherein the boric acid is present in the medium in an amount of about 5 to 10 ppm as determined by measuring the boric acid concentration in the steam generator blowdown.

10. The invention of claim 8, wherein the polyhydric compound is ethylene glycol.

11. The invention of claim 8, wherein the polyhydric compound is present in the medium in an amount which is equimolar to the amount of boric acid in the medium.

12. The invention of claim 11, wherein the polyhydric compound is ethylene glycol.

13. The invention of claim 8, wherein said diol boric acid complex is volatile.

14. A method for inhibiting corrosion in a steam generating system comprising:
providing a corrosion inhibiting quantity of boric acid in the steam system water; and
incorporating in the boric acid containing steam system water, an activating amount of a polyhydric compound sufficient to increase the acid strength of the boric acid and thus improve the corrosion inhibiting characteristics thereof.

15. The invention of claim 14, wherein the boric acid is present in the water in an amount of from about 5 to about 10 ppm as determined by measuring the boric acid concentration in the steam generator blowdown.

16. The invention of claim 14, wherein said polyhydric compound is capable of reacting with the boric acid to produce an activated, volatile diol boric acid complex having the structure

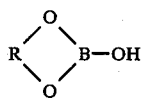

17. The invention of claim 16., wherein the polyhydric compound is present in the water in an amount which is equimolar to the amount of boric acid therein.

18. A method for inhibiting carbon steel corrosion in the secondary system of a nuclear steam generator comprising:
providing a corrosion inhibiting quantity of boric acid in the secondary system water; and
incorporating in the boric acid containing secondary system water, an activating amount of a polyhydric compound sufficient to increase the acid strength of the boric acid and improve the corrosion inhibiting characteristics thereof.

19. The invention of claim 18, wherein the boric acid is present in the water in an amount of from about 5 to about 10 ppm as determined by measuring the boric acid concentration in the steam generator blowdown.

20. The invention of claim 18, wherein said polyhydric compound is capable of reacting with the boric acid to produce an activated, volatile diol boric acid complex having the structure

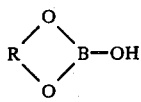

21. The invention of claim 20, wherein the polyhydric compound is present in the water in an amount which is equimolar to the amount of boric acid therein.

22. A method as set forth in claim 18, wherein is included the step of subjecting the secondary system to a low power soak with water containing increased levels of boric acid and polyhydric compound prior to powering up of the generator for normal full power operation.

23. The invention of claim 22, wherein the polyhydric compound is present in the water during both the low power soak and normal full power operation in an amount which is equimolar to the amount of boric acid in the water for the purpose of producing an activated complex having the structure

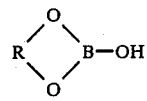

24. A method as set forth in claim 23 wherein the boric acid is present in the water in the amount of from about 30 to 100 ppm during the soak and in an amount of from about 5 to 10 ppm during normal operation of the generator.

25. A method for inhibiting carbon steel corrosion in the secondary system of a nuclear steam generator comprising:
   providing a corrosion inhibiting quantity of from about 5 to about 10 ppm of boric acid in the secondary system water;
   incorporating in the boric acid containing secondary system water, an equimolar, activating amount of a polyhydric compound capable of reacting with boric acid to increase its acid strength and produce an activated, volatile diol boric acid complex having the structure

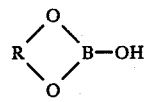

* * * * *